May 19, 1936.  M. NIRDLINGER  2,041,263
WEED PULLER
Filed Oct. 25, 1934
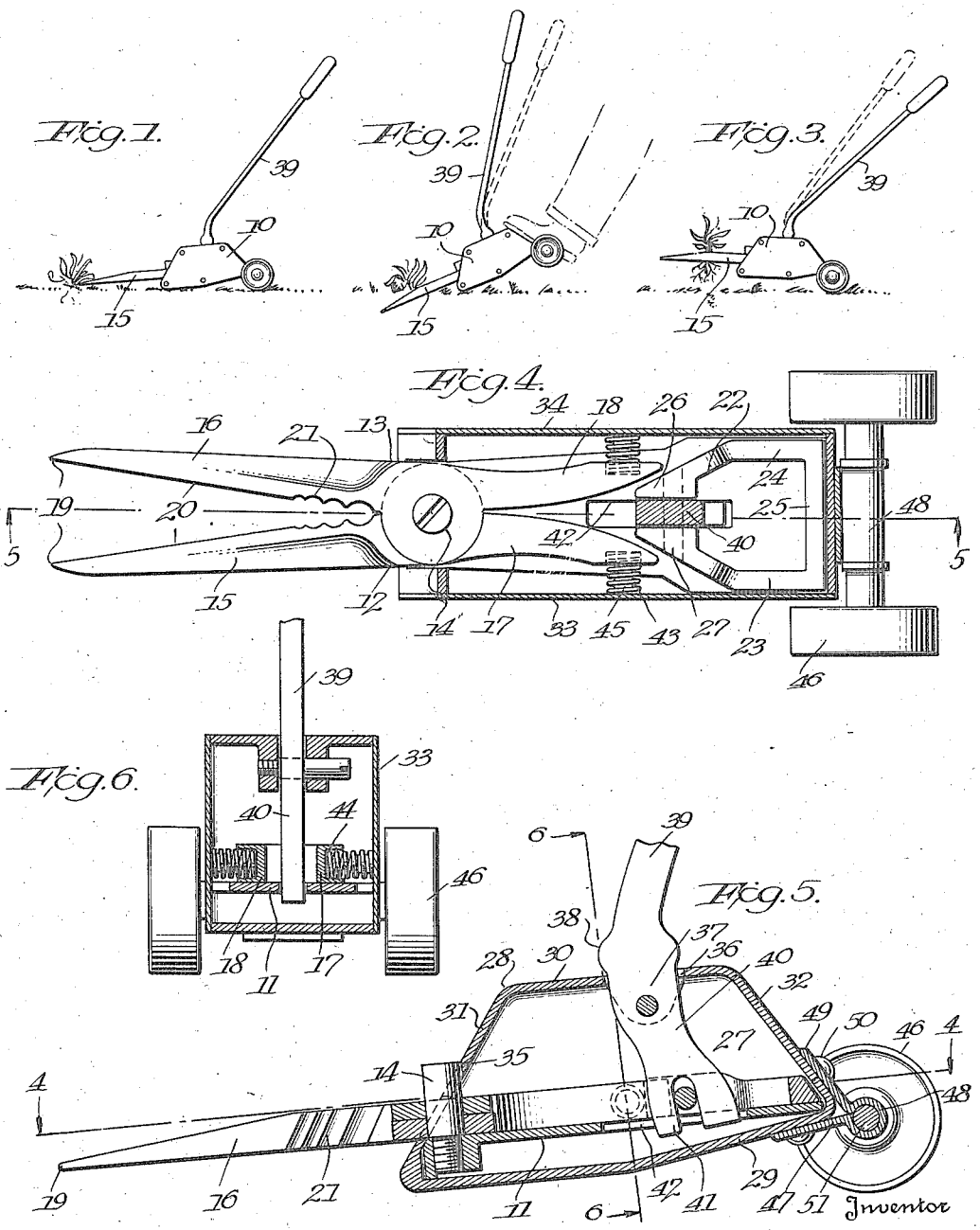
Inventor
Maximilian Nirdlinger
By Cushman, Darby & Cushman
Attorneys Patented May 19, 1936

2,041,263

UNITED STATES PATENT OFFICE 2,041,263

WEED PULLER

Maximilian Nirdlinger, Pittsburgh, Pa.

Application October 25, 1934, Serial No. 750,000

17 Claims. (Cl. 254—132)

This invention relates to weed pullers, an object being to provide a weeder which may be quickly and easily manipulated to pull weeds with the minimum of effort.

Another object is the provision of a weeder having pivoted jaws which may be quickly inserted into the ground to grasp the roots of the weed and entirely remove the weed from the ground.

Still another object is to so design a weed puller that the person operating the same need not stoop or bend over during the weeding operation.

A further object is the provision of a weed puller which may be moved along the ground to approach the weed from a horizontal position and thus eliminate the necessity of lifting the weeder from the ground during any part of the weeding operation.

With the foregoing and other objects in view, the invention will now be more fully described, reference being had to the accompanying drawing, in which:—

Figure 1 is a side elevation of the weed puller showing its position just prior to the weeding operation;

Figure 2 is a similar view illustrating the method of inserting the jaws of the weed puller into the ground;

Figure 3 is a similar view showing the weed gripped between the jaws of the weeder after it has been removed from the ground;

Figure 4 is a top plan view of the weed puller, partly in section;

Figure 5 is a longitudinal cross-section on line 5—5 of Figure 4.

Figure 6 is a vertical cross-section on line 6—6 of Figure 5.

Referring to the drawing which illustrates the preferred embodiment of my invention, the numeral 10 designates generally a weed puller comprising a substantially flat supporting base 11 upon which is mounted a pair of levers 12 and 13 pivoted intermediate of their ends adjacent the front of the supporting base as at 14. These levers are so formed as to provide outer weed engaging jaws 15 and 16 and inner arms 17 and 18, respectively. The weed engaging jaws project forwardly from the supporting base and are tapered toward their front ends to form relatively sharp points 19 to permit the jaws to easily and quickly penetrate the surface of the ground. The jaws are provided with flattened opposed faces 20 constituting weed gripping portions, and these faces are formed adjacent their inner ends with a plurality of opposed semi-circular recesses 21 increasing in size toward the pivot point of jaws and cooperating when the jaws are closed to form circular openings to receive tap roots should the flat faces 20 fail to grip the roots.

The inner arms 17 and 18 extend rearwardly on the supporting base and diverge rearwardly to form a substantially V-shaped opening when they are closed to their fullest extent. A cam plate 22 is positioned in the rear of the arms 17 and 18 and comprises a substantially hollow rectangular member having side portions 23 and 24 connected by a rear portion 25. The side portions converge at their forward ends to provide a wedge 26 and the extreme forward ends of these diverging portions are spaced apart and connected by a cross rod 27. Cam plate operating means which will be described hereinafter, function to slide the plate forwardly whereby the front tapered portion thereof will enter the V-shaped opening formed by the diverging inner arms 17 and 18. This movement will force the arms outwardly and thus close the weed engaging jaws 15 and 16.

The numeral 28 designates a casing or housing enclosing the supporting base, inner lever arms and cam plate and constitutes a protection from dirt, refuse and the like. The casing is substantially box-shaped, having a bottom wall 29, a top wall 30, inclined front and rear walls 31 and 32 respectively and side walls 33 and 34. The front wall 31 is provided with an opening 35 through which project the weed engaging levers 15 and 16. In the top wall 30 of the casing is formed an opening 36 and at each side of the opening are positioned interior ears 37 which constitute bearings for pivotally mounting an operating lever 38. This lever comprises an outer handle 39 and an inner cam plate actuating section 40, which is positioned in the space between the forward diverging sides of the cam plate. The extreme inner end of the section 40 is bifurcated to provide legs 41 which straddle the rod 27 and the supporting base 11 has a longitudinally extending slot 42 formed in its rear section to receive and guide the legs 41 when the lever 38 is operated.

In order that the weed engaging jaws 15 and 16 are normally retained in open position, I provide suitable springs interposed between the inner arms 17 and 18 and the side walls 33 and 34 of the casing. In the preferred form, coil springs 43 are used and these are positioned in countersunk portions 44 formed in the arms. To further retain the spring in operative position, each side wall of the casing is provided with an inwardly projecting lug 45 aligned with the corresponding countersunk portion 44 and which is embraced by the outer end of the spring. The side wall 33 is detachable from the casing to permit access to the interior thereof. The other side wall 34 may also be detachable if desired but in the drawing I have shown only one wall secured to the casing by suitable screws. With this arrangement, when the cam plate is out of engagement with the inner arms 17 and 18, the springs urge the arms together, moving the levers about their pivot 14 and forcing the jaws into open position. Preferably the springs are of sufficient strength to close the arms and force the cam plate to its inoperative position when the handle is released.

To permit the weed puller to be easily moved along the ground, I provide the same with rear wheels or rollers 46 suitably secured to the rear end of the casing 28. The specific means for mounting these wheels comprises a plate 47 bent upon itself to form an axle housing 48 and having forwardly diverging ears 49 which engage the walls 32 and 29, respectively, and are secured thereto by means of suitable screws 50. An axle 51 is mounted in the axle housing and the wheels 46 are journalled on opposite ends of the axle in any well known manner.

Assuming that a weed is to be pulled, the handle 39, which preferably is about four feet in length, is grasped in the hand of the operator and moved forwardly, thus pushing the weed puller forwardly along the ground until the end portions of the jaws are directly in front of the weed, as shown in Figure 1. The operator places his foot upon the inclined rear wall 32 of the casing, as illustrated in Figure 2, and the device is then tilted forwardly and downwardly so that the sharp prongs or end portions 19 of the jaws penetrate the ground, the continued movement forcing the jaws around the roots of the weed. The handle 39 is then moved to its rearmost position, which action closes the jaws so that the flat faces 20 firmly grip the weed roots and loosen the weed from the soil. With the handle still in its rearmost position, a continued backward movement thereof raises the front of the casing with the jaws still gripping the weed, as shown in Figure 3, the wheels acting as a pivot or fulcrum about which the casing swings. The weed having been fully removed from the ground, the handle is then relaxed. The pressure of the springs 43 closes the arms 17 and 18 and opens the jaws 15 and 16, thus permitting the weed to be dislodged and released by a slight backward movement of the device.

This operation may be repeated easily and quickly to rid a garden or lawn of weeds. Furthermore, weeds may be removed without the necessity of the operator stooping or bending. Again, by reason of its horizontal approach, this weed puller eliminates the necessity of lifting the same off the ground during any part of its operation.

While the arrangement shown in the drawing is the preferred embodiment of my invention, it is to be understood that certain changes may be made without departing from the spirit of the invention. For instance, the supporting plate may be eliminated and the bottom wall 29 of the casing may be utilized to support the inner arms of the weed engaging levers and the slidable cam plate.

I claim:—

1. In a weed puller, a substantially flat supporting base, a pair of levers mounted on said base and pivoted intermediate of their ends to provide outer weed engaging jaws and inner arms, a cam plate slidably mounted on said base and movable forwardly between said arms to close the jaws for engaging a weed and movable rearwardly from the arms to release the weed, a casing enclosing said base, inner arms and cam plate and provided with a front wall having an opening through which said jaws project, and a handle pivotally mounted on the top wall of the casing and having a portion thereof projecting within the casing and connected to said cam plate, said supporting base being provided with a slot for receiving and guiding the inner end of said handle and said casing having side walls for guiding said cam plate in its forward and rearward movements.

2. In a weed puller, a supporting base movable over the ground, a pair of weed engaging levers mounted on said base and pivoted between their ends to provide outer weed engaging jaws and inner arms, a slidable cam carried by said base and movable forwardly between said arms to close the jaws to engage a weed and movable rearwardly from the arms to release the weed, and cam operating means comprising a handle mounted on the base and operatively connected to the cam and extending upwardly therefrom a sufficient distance to permit the weed puller to be operated by a person in a substantially upright position.

3. In a weed puller, a supporting base movable over the ground, a pair of weed engaging levers mounted on said base and pivoted between their ends to provide outer weed engaging jaws and inner arms, a slidable cam carried by said base and movable forwardly between said arms to close the jaws to engage a weed and movable rearwardly from the arms to release the weed, and cam operating means comprising a handle pivotally mounted on said base and having its lower end operatively engageable with said cam, the upper portion of the handle projecting upwardly from the base and adapted to be operated by a person in a substantially upright position while the weed puller is located at the surface of the ground.

4. In a weed puller, a supporting base movable over the ground, a pair of weed engaging levers mounted on said base and pivoted between their ends to provide outer weed engaging jaws and inner arms, a slidable cam carried by said base and movable forwardly between said arms to close the jaws to engage a weed and movable rearwardly from the arms to release the weed, cam operating means comprising a handle mounted on the base and operatively connected to the cam and extending upwardly therefrom a sufficient distance to permit the weed puller to be operated by a person in a substantially upright position, and spring means carried by said base and acting on the inner arms to open the weed engaging jaws when the handle is released.

5. In a weed puller, a supporting base movable over the ground, a pair of levers mounted on said base and pivoted between their ends to provide outer weed engaging jaws and inner arms, the outer ends of said jaws being pointed to permit penetration thereof into the ground, and jaw operating means carried by the base and movable into and out of engagement with said inner arms, said jaw operating means including a handle extending upwardly from the base a sufficient distance to permit the weed puller to be operated by a person in a substantially upright position, said base being provided with a foot receiving portion whereby foot pressure may be exerted in forcing the jaws into the ground.

6. In a weed puller, a supporting base movable over the ground, a pair of levers mounted on said base and pivoted between their ends to provide outer weed engaging jaws and inner arms, the outer ends of said jaws being pointed to permit penetration thereof into the ground, jaw operating means carried by the base and movable into and out of engagement with said inner arms, said jaw operating means including a handle extending upwardly from the base a sufficient distance to permit the weed puller to be operated by a person in a substantially upright position, said base being provided with a foot receiving portion whereby foot pressure may be exerted in forcing the jaws into the ground, and a roller mounted on said base to facilitate movement thereof over the ground and constituting a fulcrum about which the weed puller may swing when removing a weed from the ground.

7. In a weed puller, a casing adapted to be moved over the ground and provided with an opening, a pair of levers mounted in said casing and pivoted between their ends to provide outer weed engaging jaws projecting through the opening in the casing, said levers being provided with inner arms positioned within the casing, and jaw actuating means including an operating cam freely slidable into and out of engagement with said inner arms and guided in its movement by the walls of said casing.

8. In a weed puller, a casing adapted to be moved over the ground and provided with an opening, a pair of levers mounted in said casing and pivoted between their ends to provide outer weed engaging jaws projecting through the opening in the casing, said levers being provided with inner arms positioned within the casing, jaw operating means including a cam member movable into and out of engagement with said inner arms, and an operating handle carried by and projecting through another opening in a wall of said casing and connected to said cam member.

9. In a weed puller, a casing adapted to be moved over the ground and provided with an opening, a pair of levers mounted in said casing and pivoted between their ends to provide outer weed engaging jaws projecting through the opening in the casing, said levers being provided with inner arms positioned within the casing, jaw operating means including a cam member movable into and out of engagement with said inner arms, and an operating handle pivotally mounted on a wall of said casing and having its inner end projecting through an opening in said wall and connected to said cam member.

10. In a weed puller, a substantially box-like casing adapted to be moved over the ground and provided with openings in its front and top walls, a pair of levers mounted in said casing and pivoted between their ends to provide outer weed engaging jaws projecting through said front wall opening, said levers being provided with inner arms positioned within the casing, jaw operating means including a cam member movable into and out of engagement with said inner arms, and an operating handle pivotally mounted on the top wall of said casing and having a depending portion projecting through the opening and operatively connected with said cam members.

11. In a weed puller, a casing adapted to be moved over the ground and provided with an opening, a pair of levers mounted in said casing and pivoted between their ends to provide outer weed engaging jaws projecting through the opening in the casing, said levers being provided with inner arms positioned within the casing, and jaw actuating means comprising a cam plate having straight sides guided between the walls of the casing terminating in forwardly converging portions spaced at their extreme front ends, and a handle pivotally mounted on said casing and having one end thereof projecting into the space between the converging portions of said cam plate and operatively connected thereto for moving said cam plate into and out of engagement with said inner arms.

12. In a weed puller, a substantially box-like casing adapted to be moved over the ground and provided with openings in its front and top walls, a pair of levers mounted in said casing and pivoted between their ends to provide outer weed engaging jaws projecting through said front wall opening, said levers being provided with inner arms positioned within the casing, jaw operating means including a cam member movable into and out of engagement with said inner arms, and an operating handle pivotally mounted on the top wall of said casing and having a depending portion projecting through the opening and operatively connected with said cam members, the rear wall of said casing being inclined downwardly to provide a foot receiving portion whereby foot pressure may be exerted in forcing the jaws into the ground.

13. In a weed puller, a substantially box-like casing adapted to be moved over the ground and provided with openings in its front and top walls, a pair of levers mounted in said casing and pivoted between their ends to provide outer weed engaging jaws projecting through said front wall opening, said levers being provided with inner arms positioned within the casing, jaw operating means including a cam member movable into and out of engagement with said inner arms, and an operating handle pivotally mounted on the top wall of said casing and having a depending portion projecting through the opening and operatively connected with said cam member, and coil springs interposed between each inner arm and the adjacent side wall of said casing to open the weed engaging jaws when the handle is released.

14. In a weed puller, the combination of a supporting base, a pair of weed-engaging levers mounted on said base and pivoted between their ends to provide outer weed-engaging jaws and inner cam-engageable arms, a freely movable cam to engage said arms and close said weed-engaging jaws, and cam operating means comprising a handle member mounted on said base and engaging said cam so as to exert continuous cam action on said arms and an elevating and constantly increasing gripping action of said weed-engaging levers during movement of said handle member.

15. In a weed puller, the combination of a supporting base movable over the ground, a pair of weed-engaging levers mounted on said base and pivoted between their ends to provide outer weed-engaging jaws and inner cam-engageable arms, a freely movable cam to engage said arms and close said weed-engaging jaws, cam operating means comprising a handle member mounted on said base and engaging said cam so as to exert continuous cam action on said arms and an elevating and constantly increasing gripping action of said weed-engaging levers during movement of said handle member, and a roller mounted on said base to facilitate movement thereof over the ground and constituting a fulcrum about which the weed puller may swing when removing a weed from the ground.

16. In a weed puller, a supporting base movable over the ground, a pair of levers mounted on said base and pivoted between their ends to provide outer weed engaging jaws and inner arms, the outer ends of said jaws being pointed to permit penetration thereof into the ground, and jaw operating means carried by the base and movable into and out of engagement with said inner arms, said jaw operating means including a handle extending upwardly from the base a sufficient distance to permit the weed puller to be operated by a person in a substantially upright position.

17. In a weed puller, a casing adapted to be moved over the ground and provided with an opening, a pair of levers mounted in said casing and pivoted between their ends to provide outer weed engaging jaws projecting through the opening in the casing, said levers being provided with inner arms positioned within the casing, an operating handle pivotally mounted on a wall of said casing and having its lower end projecting through an opening in said wall, and jaw operating means associated with the lower end of the handle and movable into and out of engagement with the inner arms of said jaws upon actuation of said handle.

MAXIMILIAN NIRDLINGER.